UNITED STATES PATENT OFFICE.

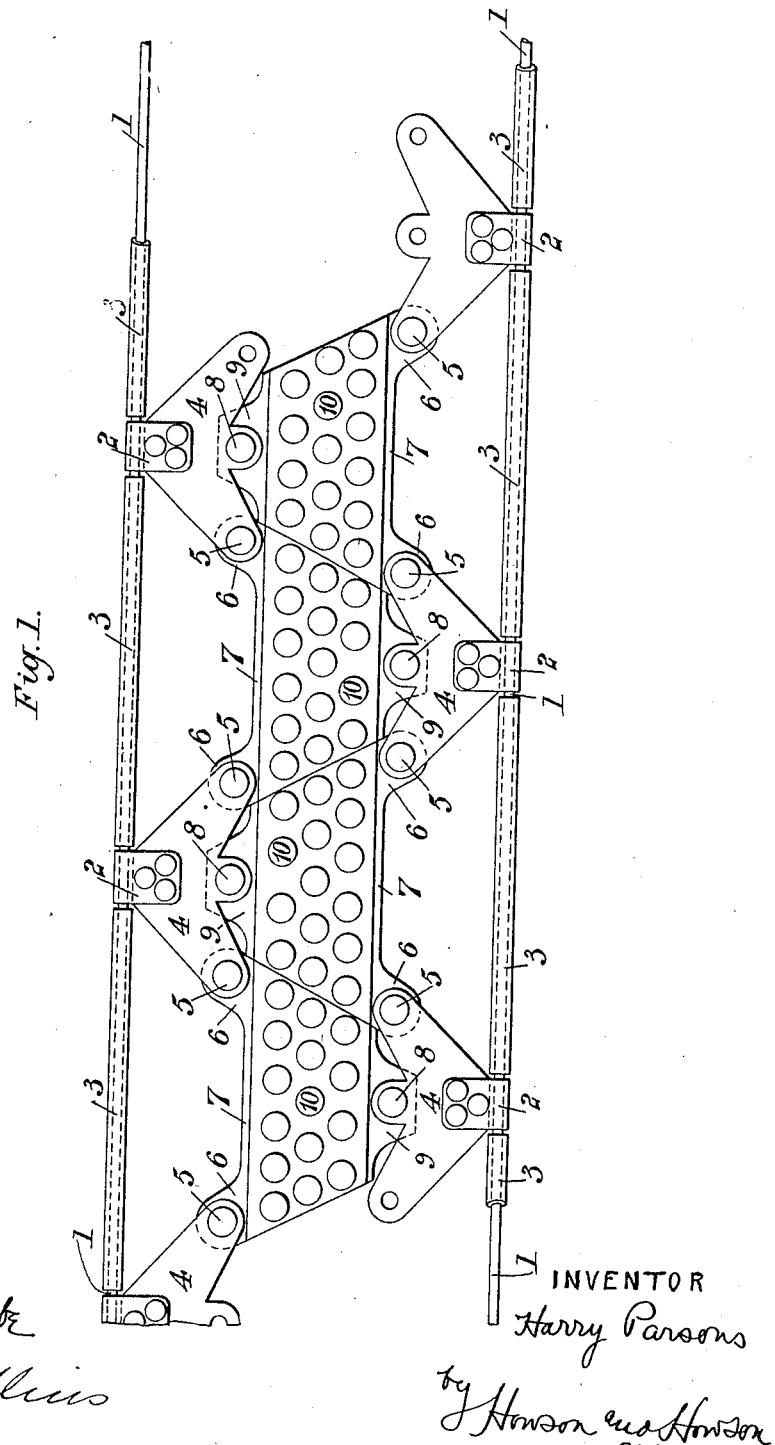

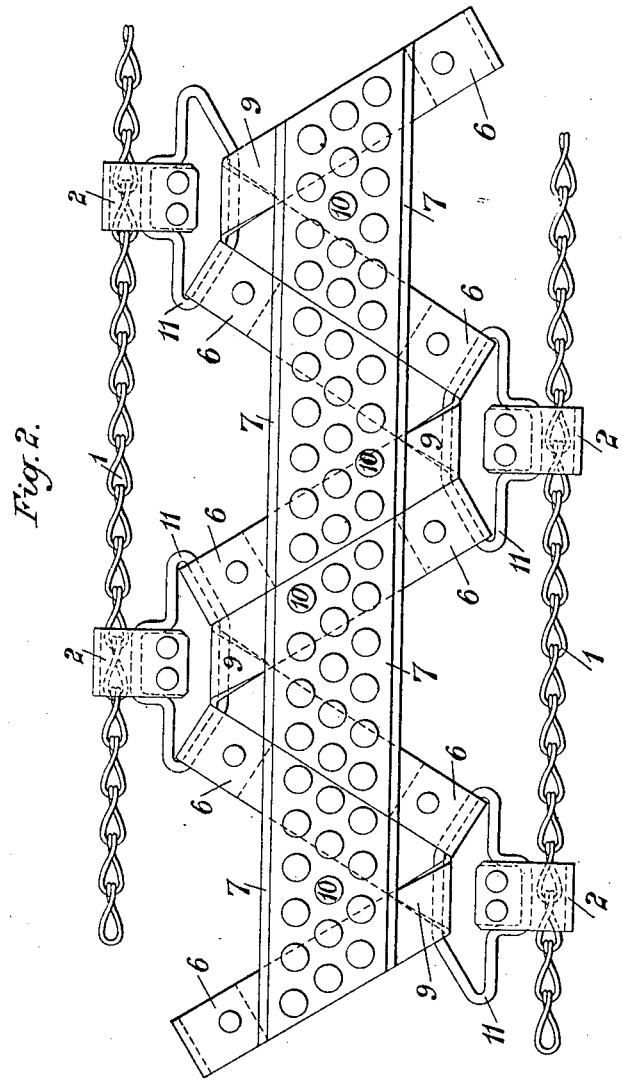

HARRY PARSONS, OF SOUTHAMPTON, ENGLAND.

TIRE-PROTECTOR.

No. 885,515.

Specification of Letters Patent.

Patented April 21, 1908.

Application filed August 27, 1906. Serial No. 332,122.

*To all whom it may concern:*

Be it known that I, HARRY PARSONS, a subject of the King of Great Britain and Ireland, residing at 150 Millbrook road, in the city and county of Southampton, England, engineer, have invented a new and useful Improved Tire-Protector, of which the following is a specification.

In the specification of Letters Patent No. 23671 dated the 30th October 1902 granted to me, is described an anti-slipping device which is free to creep, or travel, round the tire, and the object of my invention is to provide a device which has this property of freedom to creep, or travel, round the tire, together with that of protecting the tire, or preventing puncture, and skidding, or side slip, and presenting other advantages as hereinafter set forth.

According to my present invention I employ a pair of rings, or their equivalent, (such as chains for example) situated one at each side of the wheel, as in my aforesaid prior device, but I connect, with these rings, or their equivalent, pieces of material arranged to form a protective ring consisting of a number of members capable of movement relatively to each other, but forming a practically continuous protecting strip, or surface, around the tread of the tire. The said protective ring can creep over the tire as it rotates and, being made of separate pieces, does not work off sidewise as would be the case if the protective ring were a continuous strip, unless such ring were held immovably and then, of course, the desirable advantages of creeping round the tire would not be obtained. The said pieces of protective material are of a yielding and tough character which will protect the tire from puncture, or other injury, and they are provided with studs, or analogous devices, to render them more durable and also prevent skidding, or side-slip. The said pieces of protective material may be connected to the side-rings, or their equivalents, in any convenient manner, and either, or both, of the said side-rings, or the like, may be provided with fastenings for opening out the ring, or rings, or the like, for removal and replacement of the device.

I describe the following arrangements according to my invention with reference to the accompanying drawings in which Figures 1 and 2 are plan views of different modifications which will serve as examples of suitable constructions in accordance with my invention, but I do not limit myself to these examples.

Referring first to the construction shown in Fig. 1. This shows, flattened out, a sufficient portion of a device to illustrate the arrangement, it being understood that the complete article is a circular device consisting of a number of parts as shown sufficient to extend all round the wheel, the rings or chains 1 at the sides being of course of so much less diameter than the tire as to retain the device on the wheel. The side-rings 1 each carry links, or eye-pieces 2, which are shown as being kept apart by tubular distance-pieces 3 (flexible, or not) threaded on the said side-rings 1 between adjacent links, or eye-pieces 2. The said links, or eye-pieces, 2, on the one ring 1 are shown as being situated midway between those on the other ring 1. The said links, or eye-pieces, 2, have secured to, or formed with, them, link-pieces 4 (which may be of metal, or chrome-tanned leather, or any other suitable material) each such link-piece 4 being provided with attachments at 5, for one of two ears 6, 6, at the ends on one side of two of the pieces 7 of protective material which are to form the ring over the tread of the tire, and with an attachment at 8, midway of those aforesaid, for the connection of an ear 9, projecting from the other side of the piece 7 of protective material which comes between two pieces connected to the end attachments at 5 of the said link pieces 4. The meeting edges of the said pieces of protective material 7 are preferably reversely inclined, as shown, so that the said edges are not at right angles to the plane of the wheel, but diagonal thereto. The said pieces 7 may be made of any suitable substance, such, for example, as chrome-tanned leather, or hide, or strong textile fabric, and they are provided with studs 10, or the equivalents, to render them more durable and prevent skidding, or side-slip.

Fig. 2 illustrates an arrangement wherein the rings 1 are made of chain on which the links, or eye-pieces, 2 are strung, these having connected to them metal loops 11 (taking the place of the link-pieces 4 of the arrangement Fig. 1) with which loops 11 the pieces of protective material 7 are connected by strips of leather or other suitable material secured to the said pieces 7, the ends 6, of these strips being the equivalents of the ears 6, in Fig. 1 and the mid looped portion 9 of the said strips being the equivalents of the ears 9 in Fig. 1.

The devices, made in accordance with this invention, do not damage the tires but protect them and can be used as coverings for worn tires, or for thin tires, and will prevent undue heating of the tires, while road matter is prevented from remaining between the device and the tire as the relative positions of any given parts of the tire and of the device are constantly altering circumferentially. Advantages as against non-puncture strips affixed to the tire are that, with my improved devices, in addition to the devices being detachable, it is not necessary to send the tire to the repairer when a new protective device, or repair of the old one, is required; there is practically no heating of the tire causing blistering and disintegration; there is less slowing effect on the tire, repairs of the tire and tube are more readily effected, and there is no liability to the devices bursting as has been the case with previously made detachable devices which have been put on tightly, and my improved devices will not retain dirt, or stones, between themselves and the tire, and it is not necessary to jack up the wheel, or to deflate the tire in applying my devices to pneumatic tires.

Having now particularly described and ascertained the nature of my said invention and in what manner the same is to be performed I declare that what I claim is:—

1. A detachable device for the purposes aforesaid, the said device comprising a pair of rings, of less diameter than the tire, one for each side of the wheel, the said rings being connected by pieces of protective material extending over the tread of the tire, the said protective pieces being made with inclined sides and being reversely disposed alternately and constituting members capable of movement relatively to each other, but forming a practically continuous strip, or surface, around the tread of the tire and being flexible crosswise of the tire and capable of circumferential movement, or creeping, around the tire.

2. A tire protector having a plurality of protecting pieces with sides reversely inclined diagonally across the tire and means for loosely securing the same upon the tire so that the said protector can creep around the tire as the wheel rotates.

3. A tire protector comprising a series of adjacent protecting pieces with sides reversely inclined diagonally across the tire and means for loosely securing the same upon the tire so that the said protector can creep around the tire as the wheel rotates.

4. A tire protector comprising a plurality of protecting pieces with sides reversely inclined diagonally across the tire, a securing ring on each side of the tire and means for fastening said protecting pieces thereto zigzag at points diagonally arranged on opposite sides of the tire.

In testimony whereof I have signed this specification in the presence of two subscribing witnesses.

HARRY PARSONS.

Witnesses:
RICHD. JONES,
HARVEY J. BAVERSTAK.